United States Patent [19]

Barraclough

[11] Patent Number: 5,739,707

[45] Date of Patent: Apr. 14, 1998

[54] WAVE SHAPING TRANSMIT CIRCUIT

[75] Inventor: Stephen Robert Barraclough, Wokingham, England

[73] Assignee: Lucent Technologies Inc., Murray Hill, N.J.

[21] Appl. No.: 685,080

[22] Filed: Jul. 23, 1996

[30] Foreign Application Priority Data

Sep. 6, 1995 [GB] United Kingdom .................. 9518183

[51] Int. Cl.⁶ ........................ H03K 17/16; H03K 17/687
[52] U.S. Cl. ........................ 327/112; 327/126; 326/27; 326/87
[58] Field of Search ........................ 327/108, 109, 327/112, 387, 389, 391, 361, 126, 379; 326/26, 27, 87, 91

[56] References Cited

U.S. PATENT DOCUMENTS

| 4,992,676 | 2/1991 | Gerosa et al. | 326/87 |
| 5,111,075 | 5/1992 | Ferry et al. | 326/87 |
| 5,517,129 | 5/1996 | Matsui | 326/28 |

FOREIGN PATENT DOCUMENTS

| 452684A | 10/1991 | European Pat. Off. | 326/87 |
| 599631A | 6/1994 | European Pat. Off. | 327/389 |
| 1-135118 | 5/1989 | Japan | 327/389 |
| 4-180310 | 6/1992 | Japan | 327/389 |
| 4-321320 | 11/1992 | Japan | 326/87 |
| 5-206829 | 8/1993 | Japan | 326/87 |

OTHER PUBLICATIONS

Jerrell P. Hein et al, Tham 11.3: "A Single-Chip Digital Interface for the DSI Intraoffice Environment", Session 11: Data Communications ICs, 1989 *IEEE International Solid-State Circuits Conference*, ISSCC 89, Feb. 16, 1989, Trianon Ballroom, pp. 148-149.

*Primary Examiner*—Timothy P. Callahan
*Assistant Examiner*—T. T. Lam

[57] ABSTRACT

An integrated circuit driver for providing data to a communications channel comprises first and second output buffers coupled to first and second output conductors (e.g. bondpads) respectively. Each output buffer comprises a multiplicity of pull-up transistors and a multiplicity of pull-down transistors coupled to the associated output conductor through pull-up resistors and pull-down resistors, respectively. A multiplicity of delay circuits coupled to a data input node supply delayed data signals to the control terminals of the pull-up and pull-down transistors. Control circuitry is included for selectively activating the delay circuits. In a typical case, the control circuitry comprises multiplexers each having an output that is coupled to the input of a corresponding delay circuit. Advantages of the technique include a constant output impedance and waveshaping of the data output for reduction of harmonics. A typical application of the driver is in an Ethernet twisted-pair wire communication system, wherein external components (resistors and center-tapped transformer) may be eliminated.

22 Claims, 5 Drawing Sheets

WAVE SHAPING TRANSMIT CIRCUIT

BACKGROUND OF THE INVENTION

1. Field of the Invention

The present invention relates to a circuit for transmitting data over a communication channel, and a communication system and method using the circuit.

2. Description of the Prior Art

The use of twisted pair wires to implement an Ethernet communication system has increased significantly in the last few years. For example, the "10baseT" Ethernet system transmits data at a rate of 10 megabits per second, while the "100baseT" transmits at 100 megabits per second over a twisted pair wire communication channel. Still higher data rates are used or envisioned on coaxial cable, optical fiber, or microwave radio communication channels. In many cases, the waveform of the transmitted data must be modified from a square-wave form that typically represents binary data. For example, in the Ethernet twisted pair systems, the waveform must be shaped so as to significantly reduce harmonics beyond a given frequency (e.g., 17 MHz in the case of 10baseT systems). Similarly, in digital cellular phone and personal communication system (PCS) radio systems operating in the UHF radio band, the generation of harmonics must be limited.

In order to drive a twisted pair cable according to 10baseT specifications, the driver must provide at least a 4.4 volt peak-to-peak signal onto a 100 ohm load via a 1:1 center tapped coupling transformer. The common mode voltage should be <±50 mV. In addition, pre-emphasis capability must be provided to introduce a step into the driving waveform approximately 1 volts up or down from the starting voltage level during certain rail-to-rail transitions. An additional requirement is that the output impedance of the driver must be nominally 100 ohms±20%, in order to minimize reflections. An example of a typical 10baseT waveform is shown in FIG. 1. Note that four levels are illustrated. In addition, note that the waveform has a limited slew rate between levels, as evidenced by the sloped (non-vertical) sides of the waveform. This helps minimize the harmonics noted above.

A typical Ethernet line driving circuit is shown in FIG. 2. This circuit comprises four high-drive CMOS output buffers (203, 204, 205, 206) on a single integrated circuit (IC) chip (201). Note that four bondpads (207, 208, 209, 210) are necessary on the chip (and correspondingly four package terminals) in order to connect to the external circuitry, which comprises four resistors (211, 212, 214, 215), a filter, and a 1:1 coupling transformer (218) incorporating a common mode choke.

The salient features of the circuit operation are as follows:

(1) The impedance specification of 100 ohms±20% is met by the resistor values, wherein resistors 211 and 214 are 316 ohms, and resistors 212 and 215 are 53.6 ohms. Assuming that the nominal buffer output impedance is small, typically about 10 ohms, the impedance seen looking back into the IC driver circuitry from the filter inputs is 10+2×(45.8 ohms)=101 ohms (since the parallel resistance of the 316 ohm resistor and the 53.6 ohm resistor is 45.8 ohms).

(2) The EMC specification is handled by the off-chip 7 pole Butterworth low pass filter (217) with a 3dB cut-off frequency of 17 MHz.

(3) The voltage specification is achieved by means of the resistor summing network (211–212, summed at node 213, and 214–215, summed at node 216).

The use of resistor summing and low pass filtering with components that are external to the driver IC has been widely adopted in one form or another in the industry. This provides simplicity and flexibility, but at the expense of external components.

SUMMARY OF THE INVENTION

I have invented a technique for providing data to a communications channel. A driver circuit comprises an output buffer coupled to an output conductor (e.g. bondpad). The output buffer comprises a multiplicity of pull-up transistors and a multiplicity of pull-down transistors coupled to the output conductor through pull-up resistors and pull-down resistors, respectively. A multiplicity of delay circuits supply delayed data signals to the control terminals of the multiplicity of pull-up and pull-down transistors. Control circuitry is included for selectively activating the delay circuits in accordance with a desired data pattern. In a typical case, the control circuitry comprises multiplexers each having an output that is coupled to the input of a corresponding delay circuit. For driving a balanced load, first and second output buffers each coupled to an output conductor may be provided.

DETAILED DESCRIPTION

Figure 1:
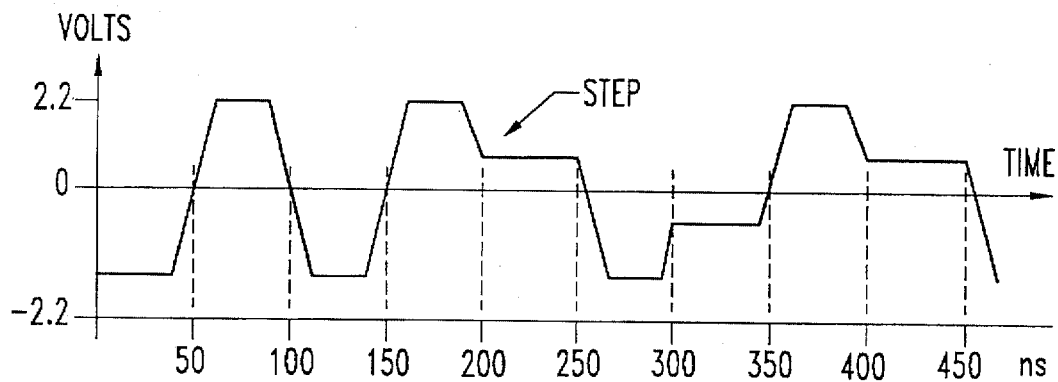
FIG. 1 shows an illustrative 10baseT Ethernet waveform.
Figure 2:
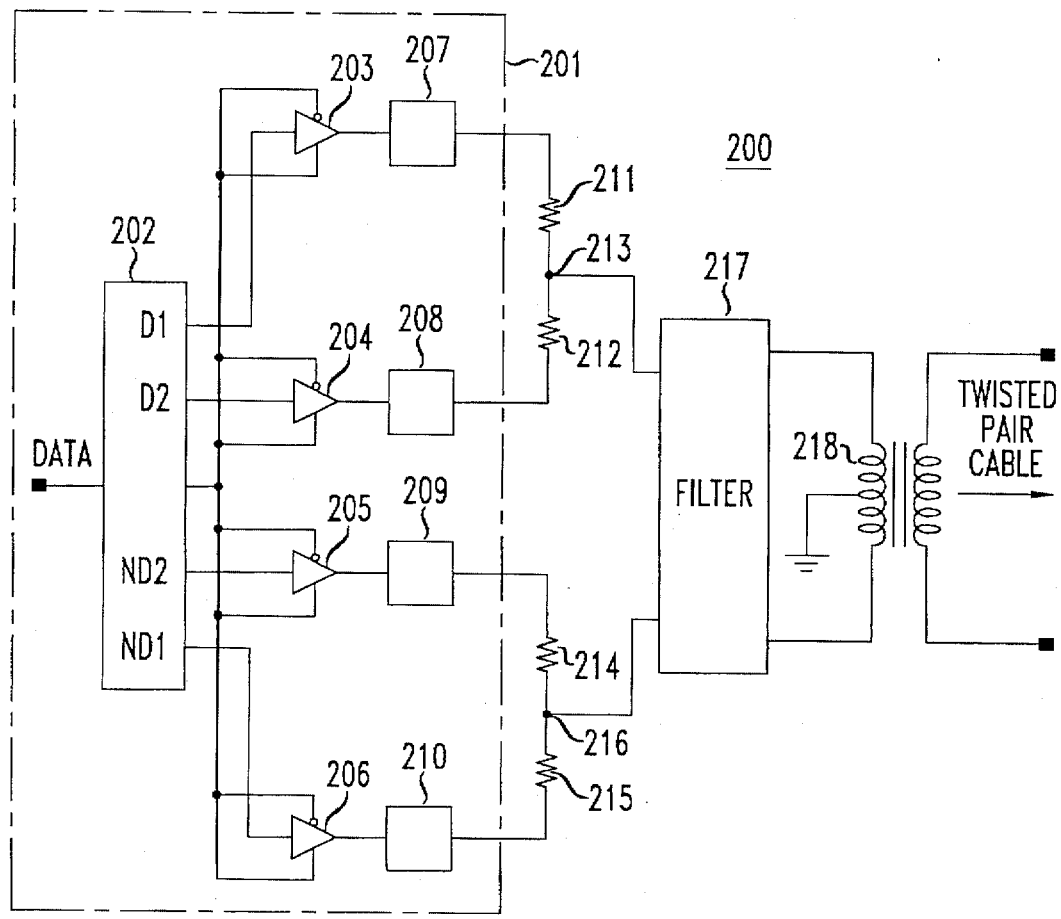
FIG. 2 shows an typical Ethernet twisted pair cable driving circuit.
Figure 3:
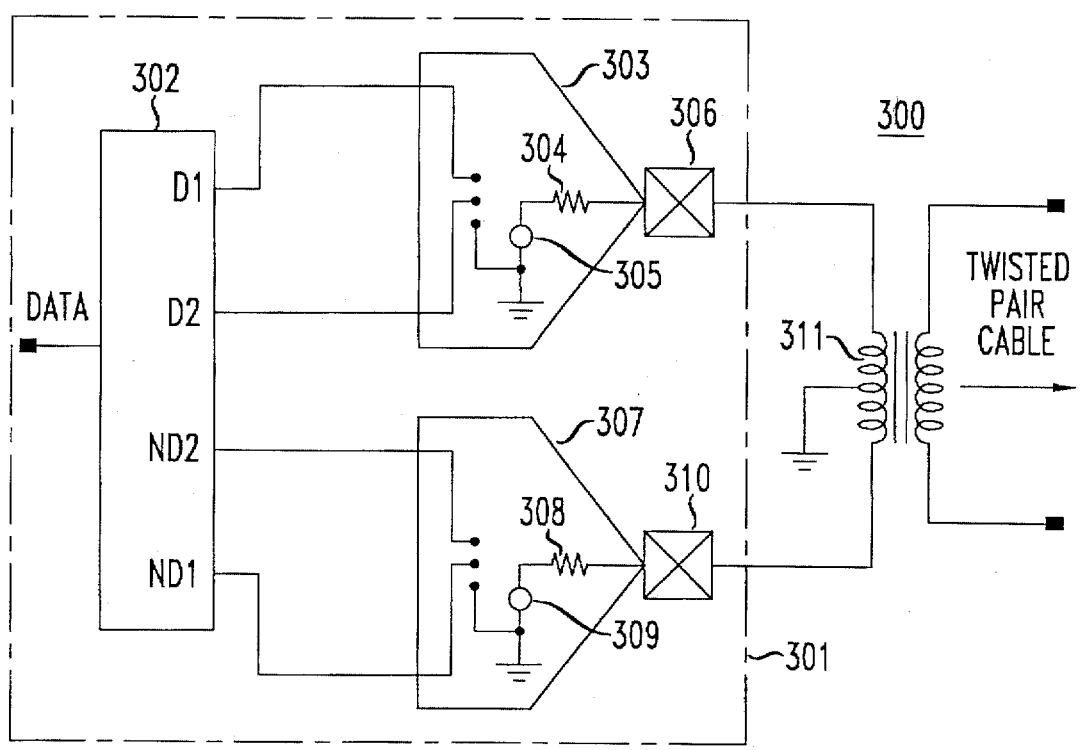
FIG. 3 shows an illustrative embodiment of the present invention.

The following detailed description relates to a technique for providing data to a communications channel. Referring to FIG. 3, an illustrative embodiment of the invention for use in a twisted-pair Ethernet system is shown, but with applicability to other systems being possible. The data transmitter includes an integrated circuit 301 having control circuitry 302 and output buffers 303 and 307. The buffers 303, 307 are connected to bondpads 306 and 310 respectively, which provide the output signals to the input terminals of center-tapped transformer 311. The output terminals of transformer 311 are coupled to a twisted-pair cable in the illustrative case. The buffer 303 is driven by data signals D1, D2, while the buffer 307 is driven by data signals ND1, ND2. Each output buffer provides a constant impedance voltage source, illustrated as a voltage source (305, 309) and an output resistor (304, 308). The output buffers also provide slew-rate limiting of the output waveform as discussed further below. Therefore, the output buffers mimic a low-pass filter so that an external low-pass filter is not necessary. The output buffers 303 and 307 drive the bondpads 306 and 310 complementary to one another to obtain full differential swing about zero volts in the illustrative embodiment. However, application of the inventive technique to single-ended designs is possible.

Figure 4:
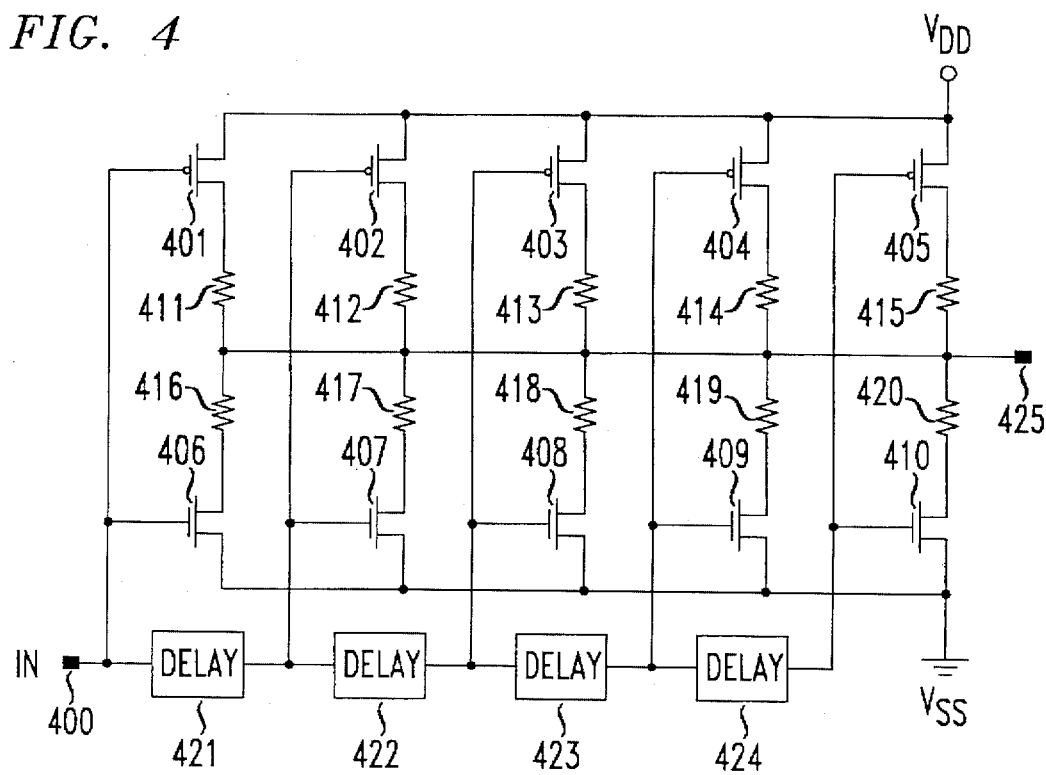
FIG. 4 shows one embodiment of a constant impedance voltage source with slew rate limiting.
Figure 5:
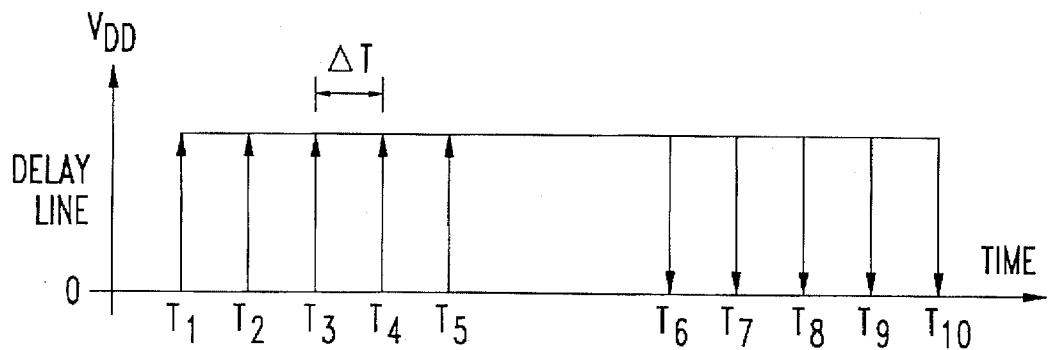
FIG. 5 shows an illustrative delay line waveform from the circuit of FIG. 4.

Referring to FIG. 4, an example of an output buffer that implements a constant impedance voltage source with slew rate limiting is shown. A multiplicity of p-channel pull-up transistors 401, 402, 403, 404 and 405 is connected to the output conductor 425 through pull-up resistors 411, 412, 413, 414 and 415, respectively. A multiplicity of n-channel pull-down transistors 406, 407, 408, 409 and 410 is connected to the output conductor 425 through pull-down resistors 416, 417, 418, 419 and 420, respectively. A delay line comprises data input node 400 and delay stages 421, 422, 423 and 424. The data input node 400 supplies a data signal to the gates of complementary transistor pair 401–406, whereas delay stages 421, 422, 423 and 424 supply delayed data signals to the gates of transistors pairs 402–407, 403–408, 404–409 and 405–410, respectively. Referring to FIG. 5, an illustrative series of waveforms representing the input data signal and delayed versions thereof is illustrated. At time $T_0$ the input data signal is low (0 volts), so that all the pull-up transistors are on and all of the pull-down transistors are off, so that output node 425 is high ($V_{DD}$). At time $T_1$ the data signal on input node 400 transitions from 0 volts to $V_{DD}$. Thereafter, at times $T_2$, $T_3$, $T_4$ and $T_5$, the delayed data signals appear at the outputs of delay stages 421, 422, 423 and 424, respectively. As a result, the complementary transistor pairs sequentially switch from high to low, thereby pulling the voltage on output node 425 lower in steps.

Figure 6:
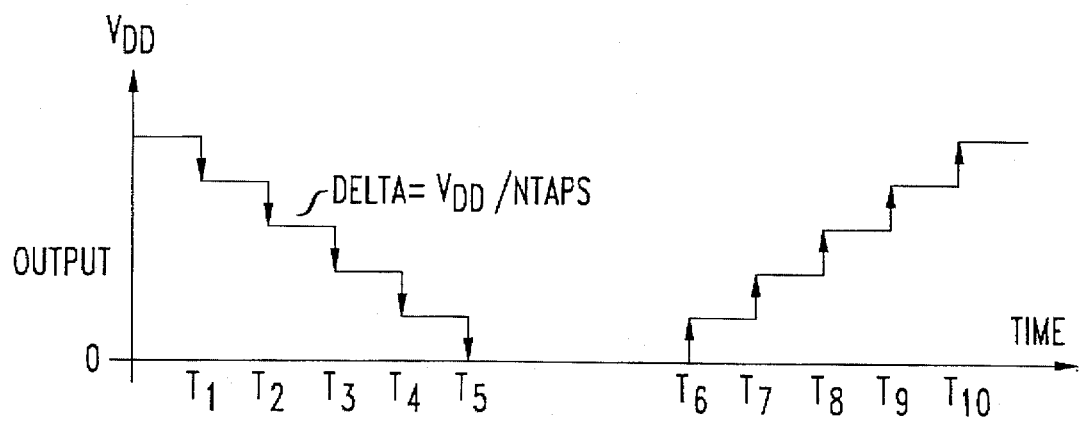
FIG. 6 shows an illustrative output waveform from the circuit of FIG. 4.

The resulting output voltage on node 425 is shown in FIG. 6, wherein the transitions between steps occur at the corresponding times noted in FIG. 5. Similarly, when input node 400 transitions from $V_{DD}$ to 0 volts at time $T_6$, the delayed data signals appear at the outputs of the above-noted delay lines at times $T_7$, $T_8$, $T_9$ and $T_{10}$. Therefore, the transistor pairs pull the output node 425 high in steps, as further illustrated in FIG. 6. Note that this step-wise technique accomplishes a smoothing of the output waveform as compared to an abrupt (square-wave) transition between $V_{DD}$ and 0 volts (and vice-versa). The magnitude of each step (DELTA) is equal to $V_{DD}/N$, where N is the number of taps of the delay line. In addition, note that at any given time, an equal number of resistors are in the drain paths of the conducting transistors, regardless of which pairs of transistors are pulling high and which are pulling low. Therefore, in the case wherein all of the resistors have the same value R, and assuming that the output resistance of the transistors is small compared to R, then the output resistance seen looking into the output node 425 is R/5 in the illustrative case of 5 transistor pairs. For example, if R=250 ohms, then the output resistance is 50 ohms for the 5 resistors that are effectively in parallel at any given time.

Figure 7:
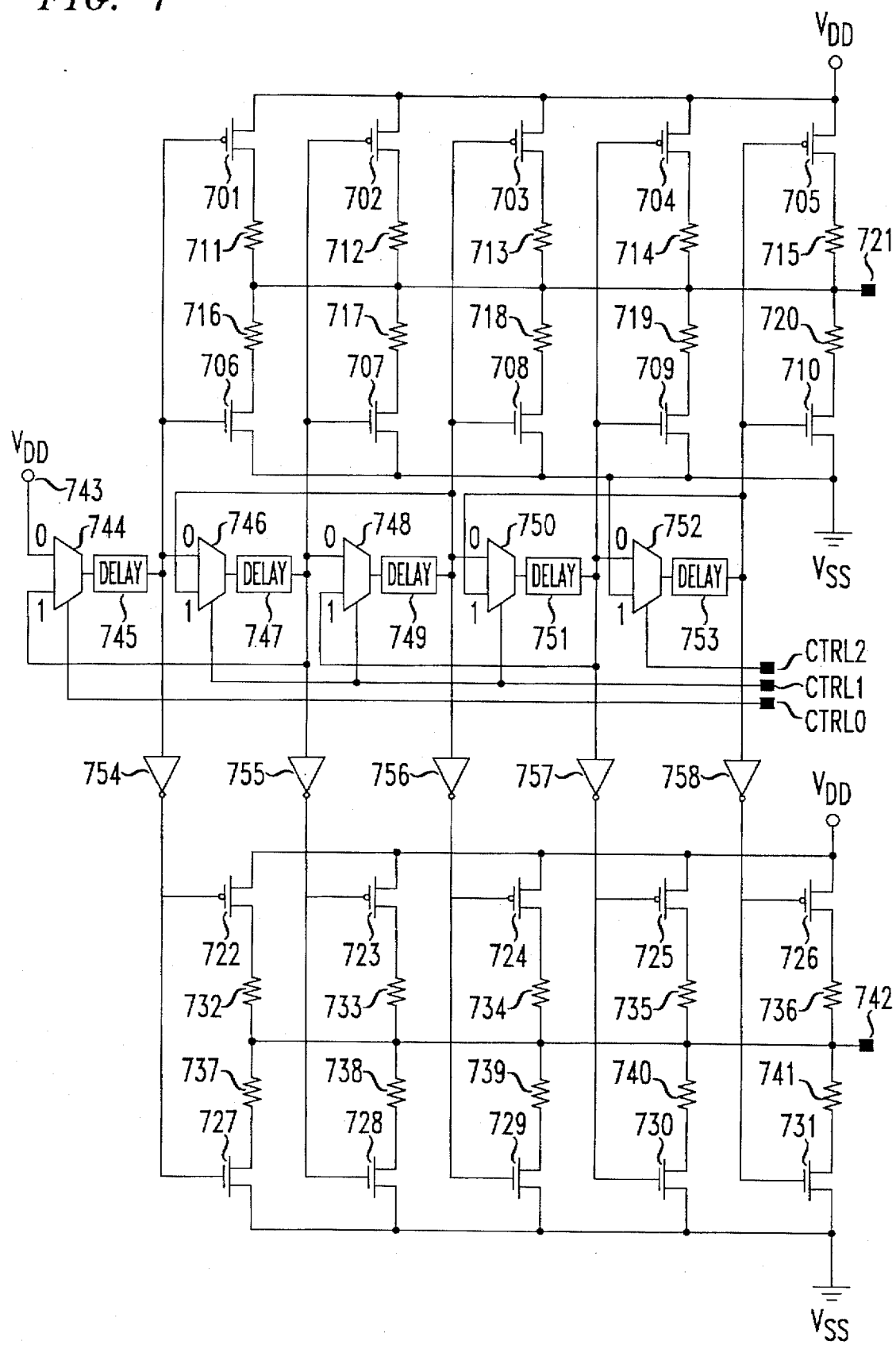
FIG. 7 shows an illustrative embodiment of an output buffer for implementing the present invention.

The present invention makes use of the delay line technique to provide intermediate voltage levels during transitions. Referring to FIG. 7, adding a multiplexer to the input of each delay stage enables the propagation of transitions to be controlled, and hence provides the capability to hold the output at any incremental voltage level. The outputs of the controlled delay stages 745, 747, 749, 751 and 753 drive the gates of complementary transistor pairs 701–706, 702–707, 703–708, 704–709 and 705–710, respectively. These transistor pairs drive the first output terminal 721 through the source resistors 711 ... 715 and 716 ... 720. Furthermore, the outputs of the controlled delay stages are inverted by inverters 754, 755, 756, 757 and 758, which drive the gates of complementary transistor pairs 722–727, 723–728, 724–729, 725–730, and 726–731, respectively. These transistor pairs drive the second output terminal 742 through the source resistors 732 ... 736 and 737 ... 741. The driver output waveform is derived from the voltage difference between terminals 721 and 742.

Figure 8:
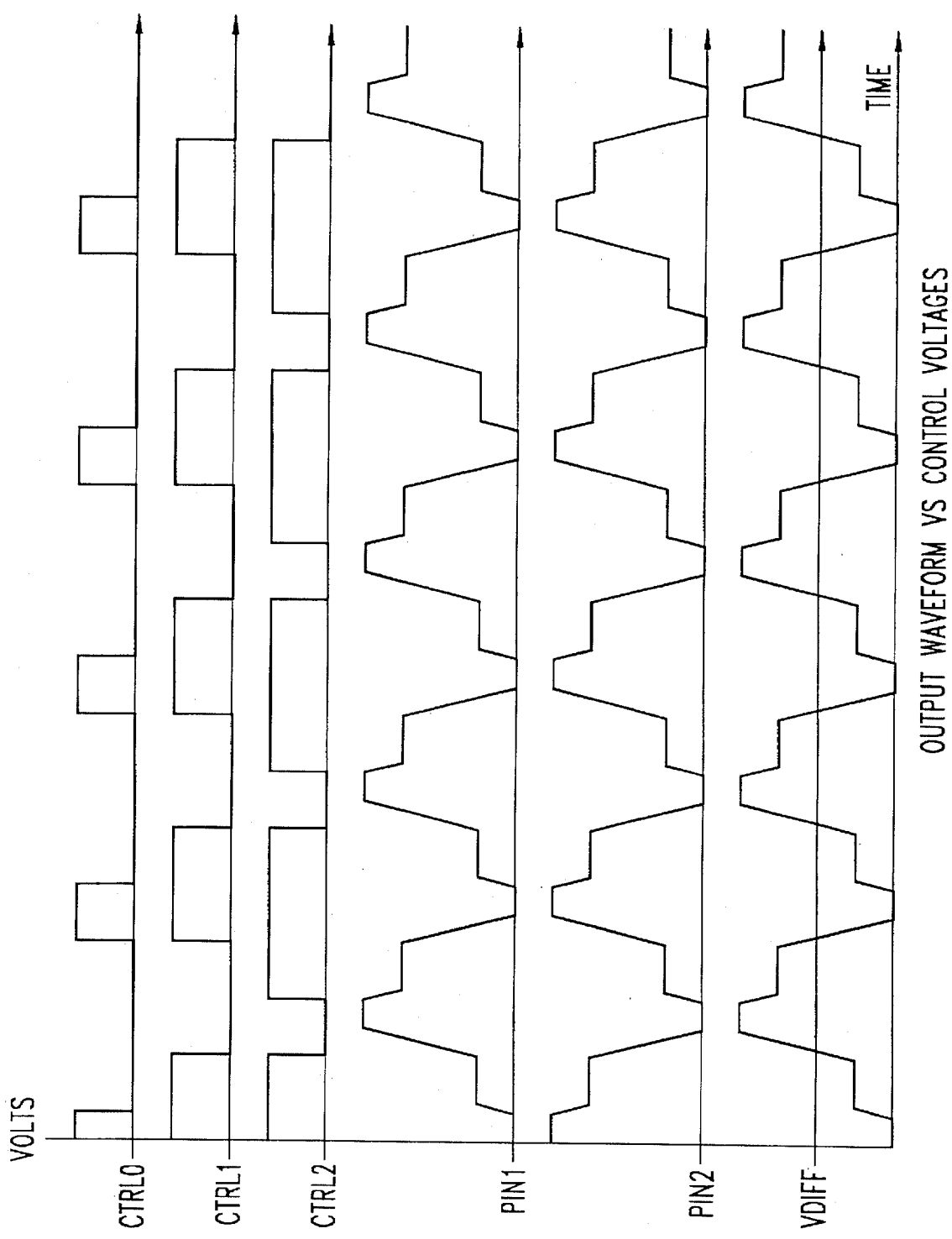
FIG. 8 shows illustrative control signals and output waveforms.

In FIG. 7, the delay line is split into three sections. That is, the first section includes delay stage 745 and multiplexer 744, which is controlled by control line CTRL0. The second section includes delay stages 747, 749 and 751 and multiplexers 746, 748 and 750, which are controlled by control line CTRL1. The third section includes delay stage 753 and multiplexer 752, which is controlled by control line CTRL2. In a typical case used for implementing an Ethernet 10baseT system, the delay stages may be two-stage inverters, with each delay stage providing a delay of about 2 nanoseconds. Propagation through each section is controlled by the corresponding control line connected to the multiplexer inputs. The "0" input of a given multiplexer is selected when the corresponding control line is at "0", and the "1" input is selected when the control line is at "1". Note that the "0" input of the left-hand multiplexer 744 is connected to a logical "1" ($V_{DD}$), whereas the "1" input of right-hand multiplexer 752 is connected to a logical "0" ($V_{SS}$). In operation, zeros propagate from right to left as viewed in FIG. 7, and ones propagate from left to right. In FIG. 8, the control signals CTRL0, CTRL1 and CTRL2 are shown in various combinations of voltage levels. The resultant output waveforms of the buffers at the IC output terminals are designated PIN1 and PIN2, and the waveform between the two IC terminals is designated VDIFF. Therefore, by changing the control signals in accordance with the data input, a desired output waveform (VDIFF in FIG. 8) may be obtained.

Figure 9:
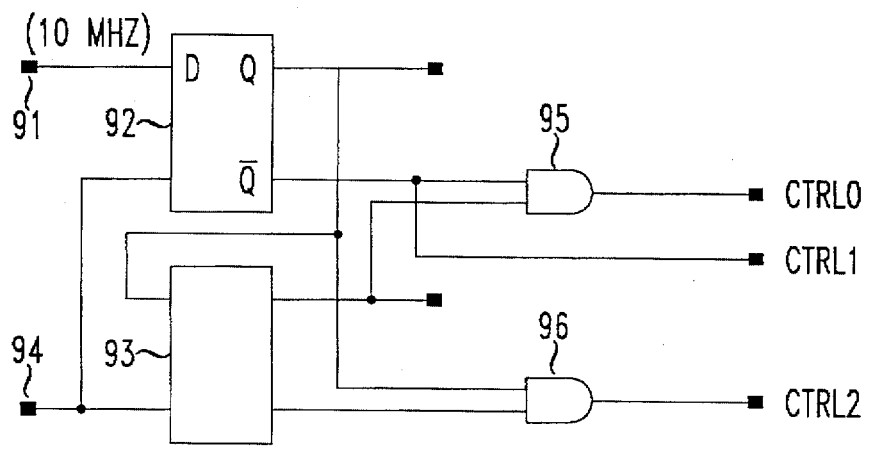
FIG. 9 shows a control circuit suitable for generating control signals.

A typical control circuit suitable for implementing the invention is shown in FIG. 9. When implementing a 10baseT system, for example, a 10 MHz Manchester encoded data stream is applied to the "D" input of DQ flip-flop 92. A 20 MHz clock is applied to the "clock" input of both DQ flip-flops 92 and 93. An AND gate 95 and NAND gate 96 are used to generate the control signals CTRL0 and CTRL2, whereas the CTRL1 signal is taken from the $\overline{Q}$ output of 92. The Q outputs of flip-flops 92 and 93 are labeled A and B, for illustrative purposes respectively. The relationship between the sampled data stream values and the control signals derived therefrom is given in the truth table below:

TABLE

| A | B | CTRL0 | CTRL1 | CTRL2 | Output State |
|---|---|-------|-------|-------|--------------|
| 0 | 0 | 0 | 1 | 1 | Step one level down from $V_{DD}$ |
| 0 | 1 | 1 | 1 | 1 | Move to $V_{DD}$ |
| 1 | 0 | 0 | 0 | 0 | Move to $V_{SS}$ |
| 1 | 1 | 0 | 0 | 1 | Step one level up from $V_{SS}$ |

In implementing the invention, the values of resistors in the drain leads of the pull-up and pull-down transistors (e.g., FIG. 4) are nominally equal when a constant output impedance is desired. The matching of the resistors may be improved by laser or electrical trimming if desired. In some cases, adjustment of the resistor values may be desired to account for the output resistance of the field effect transistors, which may not necessarily be negligible as assumed above. While the embodiment shown in FIG. 7 implements a balanced-output transmitter, the inventive technique may be used in single-ended designs as well. For example, the buffer associated with output node 742 may be omitted, and only the buffer associated with output node 721 and the multiplexers and delay lines need to be included to drive a single-ended transmission line or other load. Furthermore, while the resistors shown in FIG. 7 are typically implemented on the integrated circuit chip, they may be off-chip if desired. Although the off-chip embodiment requires more IC terminals, it allows for dissipating the resistor power off-chip, and may allow for more precise resistor values. In addition, it saves integrated circuit chip area. Still other implementations of the inventive technique are possible.

The invention claimed is:

1. A driver circuit for driving a data signal onto a communication channel, characterized in that said driver circuit comprises:
   a first output buffer including a multiplicity of pull-up transistors and a multiplicity of pull-down transistors coupled to a first output conductor through pull-up resistors and pull-down resistors, respectively;
   a multiplicity of delay circuits supplying a plurality of delayed data signals to the control terminals of the pull-up and pull-down transistors; and
   control circuitry for selectively activating the delay circuits in accordance with the data input signal.

2. The driver circuit of claim 1 wherein said control circuitry comprises multiplexers each having an output that is coupled to the input of a corresponding delay circuit.

3. The driver circuit of any one of the preceding claims wherein said driver circuit further comprises a second output buffer including a multiplicity of pull-up transistors and a multiplicity of pull-down transistors coupled to a second output conductor through pull-up resistors and pull-down resistors, respectively; and still further comprises inverters for supplying inverted data signals from said delay circuits to the control terminals of the transistors in said second output buffer.

4. The driver circuit of claim 1 or 2 wherein said pull-up and pull-down resistors have nominally equal values, whereby a constant output impedance driver circuit is obtained.

5. The driver circuit of claim 3 wherein said pull-up and pull-down resistors have nominally equal values, whereby a constant output impedance driver circuit is obtained.

6. The driver circuit of claim 1 wherein the first output buffer, the multiplicity of delay circuits and the control circuitry are fabricated together on an integrated circuit.

7. The driver circuit of claim 1 wherein the first output buffer operates to provide a constant impedance voltage source with slew rate-limiting.

8. The driver circuit of claim 6 wherein the first output buffer operates to provide a constant impedance voltage source with slew rate-limiting so that the driver circuit can be directly interfaced with the communication channel without requiring an external low-pass filter.

9. A data transmitter comprising an integrated circuit that includes a driver circuit for receiving a data signal and for driving the data signal onto a communication channel, characterized in that said driver circuit comprises;
   a first output buffer coupled to a first output conductor and a second output buffer coupled to a second output conductor, with each buffer including a multiplicity of pull-up transistors and a multiplicity of pull-down transistors coupled to the associated output conductor through pull-up resistors and pull-down resistors, respectively;
   a multiplicity of delay circuits supplying a plurality of delayed data signals to the control terminals of the pull-up and pull-down transistors; and
   control circuitry for selectively activating the delay circuits;
   and wherein said data transmitter further comprises a center-tapped transformer having first and second output conductors respectively, and having first and second output terminals for connection to twisted pair cable.

10. The data transmitter of claim 9 wherein said control circuitry comprises multiplexers each having an output that is coupled to the input of a corresponding delay circuit.

11. A data communication system comprising a communication channel and a data transmitter comprising an integrated circuit that includes a driver circuit for receiving a data signal from an input node and for driving the data signal onto said communication channel,
   characterized in that said driver circuit comprises:
   a first output buffer coupled to a first output conductor and a second output buffer coupled to a second output conductor, with each buffer including a multiplicity of pull-up transistors and a multiplicity of pull-down transistors coupled to the associated output conductor through pull-up resistors and pull-down resistors, respectively;
   a multiplicity of delay circuits coupled to said input node and supplying a plurality of delayed data signals to the control terminals of the pull-up and pull-down transistors; and
   control circuitry for selectively activating the delay circuits.

12. The system of claim 11 wherein said communication channel comprises a twisted-pair cable, and wherein said data transmitter further comprises a center-tapped transformer having first and second input terminals coupled to said first and second output conductors respectively, and having first and second output terminals coupled to said twisted pair cable.

13. The system of claim 11 or claim 12 wherein said control circuitry comprises multiplexers each having an output that is coupled to the input of a corresponding delay circuit.

14. The system of claim 13 wherein at least one of said multiplexers has a first input coupled to the output of a proceeding delay circuit, and having a second input coupled to the output of a succeeding delay circuit.

15. A method of driving a data signal onto a communication channel, characterized by
   providing a first output buffer including a multiplicity of pull-up transistors and a multiplicity of pull-down transistors coupled to a first output conductor through pull-up resistors and pull-down resistors, respectively;
   providing a multiplicity of delay circuits for supplying a plurality of delayed data signals to the control terminals of the pull-up and pull-down transistors; and
   providing control circuitry for selectively activating the delay circuits.

16. The method of claim 15 wherein said control circuitry comprises multiplexers each having an output that is coupled to the input of a corresponding delay circuit.

17. The method of claim 15 or 16 wherein said driver circuit further comprises a second output buffer including a multiplicity of pull-up transistors and a multiplicity of pull-down transistors coupled to a second output conductor through pull-up resistors and pull-down resistors, respectively; and still further comprises inverters for supplying inverted data signals from said delay circuits to the control terminals of the transistors in said second output buffer.

18. The method of any one of claims 15 or 16 wherein said pull-up and pull-down resistors have nominally equal values, whereby a constant output impedance driver circuit is obtained.

19. The method of claim 15 further comprising the step of:

providing a step-wise voltage transition to the communication channel to effect a smoothing of a voltage output seen by the communication channel.

20. A driver circuit for driving a data signal onto a communication channel, characterized in that said driver circuit comprises:

a first output buffer including a multiplicity of pull-up transistors and a multiplicity of pull-down resistors, respectively;

a multiplicity of delay circuits supplying a plurality of delayed data signals to the control terminals of the pull-up and pull-down transistors; and control circuitry for selectively activating the delay circuits in accordance with said data signal, said control circuitry comprising multiplexers each having an output that is coupled to the input of a corresponding delay circuit, wherein at least one of said multiplexers has a first input coupled to the output of a preceding delay circuit, and having a second input coupled to the output of a succeeding delay circuit.

21. A data transmitter comprising an integrated circuit that includes a driver circuit for receiving a data signal and for driving the data signal onto a communication channel, characterized in that said driver circuit comprises a first output buffer coupled to a first output conductor and a second output buffer coupled to a second output conductor, with each buffer including a multiplicity of pull-up transistors and a multiplicity of pull-down transistors coupled to the associated output conductor through pull-up resistors and pull-down resistors, respectively;

a multiplicity of delay circuits supplying a plurality of delayed data signals to the control terminals of the pull-up and pull-down transistors; and control circuitry for selectively activating the delay circuits, said control circuitry comprising multiplexers each having an output that is coupled to the input of a corresponding delay circuit, wherein at least one of said multiplexers has a first input coupled to the output of a preceding delay circuit, and having a second input coupled to the output of a succeeding delay circuit;

and wherein said data transmitter further comprises a center-tapped transformer having first and second input terminals coupled to said first and second output conductors respectively, and having first and second output terminals for connection to twisted pair cable.

22. A method of driving a data signal onto a communication channel, characterized by providing a first output buffer including a multiplicity of pull-up transistors and a multiplicity of pull-down transistors coupled to a first output conductor through pull-up resistors and pull-down resistors, respectively;

providing a multiplicity of delay circuits for supplying a plurality of delayed data signals to the control terminals of the pull-up and pull-down transistors; and providing control circuitry for selectively activating the delay circuits, said control circuitry comprising multiplexers each having an output that is coupled to the input of a corresponding delay circuit, at least one of said multiplexers having a first input coupled to the output of a preceding delay circuit, and having a second input coupled to the output of a succeeding delay circuit.

* * * * *